United States Patent
Van Wageningen (10) Patent No.: US 12,057,880 B2
(45) Date of Patent: Aug. 6, 2024

(54) INTERFERENCE MITIGATION

(71) Applicant: SIGNIFY HOLDING B.V., Eindhoven (NL)

(72) Inventor: Andries Van Wageningen, Wijlre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 53 days.

(21) Appl. No.: 17/927,166

(22) PCT Filed: Jun. 7, 2021

(86) PCT No.: PCT/EP2021/065135
§ 371 (c)(1),
(2) Date: Nov. 22, 2022

(87) PCT Pub. No.: WO2021/249923
PCT Pub. Date: Dec. 16, 2021

(65) Prior Publication Data
US 2023/0208520 A1    Jun. 29, 2023

(30) Foreign Application Priority Data

Jun. 12, 2020 (EP) ..................................... 20179609

(51) Int. Cl.
*H04B 10/114* (2013.01)
*H04B 10/116* (2013.01)

(52) U.S. Cl.
CPC ....... *H04B 10/1143* (2013.01); *H04B 10/116* (2013.01)

(58) Field of Classification Search
None
See application file for complete search history.

(56) References Cited

U.S. PATENT DOCUMENTS

| | | | |
|---|---|---|---|
| 10,461,860 B2 | 10/2019 | Miras et al. | |
| 2019/0028193 A1* | 1/2019 | Miras | H04B 10/1149 |
| 2020/0036618 A1 | 1/2020 | Asterjadhi et al. | |
| 2020/0053753 A1 | 2/2020 | Tanaka et al. | |
| 2020/0053774 A1 | 2/2020 | Inoki et al. | |

FOREIGN PATENT DOCUMENTS

| | | | | |
|---|---|---|---|---|
| WO | 2019179761 A1 | 9/2019 | | |
| WO | WO-2019179761 A1 * | 9/2019 | ......... | H04B 10/1129 |
| WO | 2020049275 A1 | 3/2020 | | |
| WO | 2020104288 A1 | 5/2020 | | |
| WO | WO-2020104288 A1 * | 5/2020 | ......... | H04B 10/1149 |

* cited by examiner

*Primary Examiner* — David W Lambert (57) ABSTRACT

An optical wireless communications, OWC, network (100) comprises a plurality of access points (120) for communicating with a plurality of endpoint devices (110) via modulated light. A control system (13) receives a report indicating a timeslot during which a first one of the access points (120*a*) detected an event indicative of interference and transmits an indication of the timeslot to at least one other access point (120*b*). The other access point (120*b*) provides to the control system (13) identifiers of any registered endpoint devices which used or are using that timeslot. If the control system (13) receives an identifier of a single endpoint device from the other access point (120*b*), it determines that endpoint device as a cause of the interference experienced at the first access point (120*a*). If the control system (13) receives identifiers of plural endpoint devices from other access points (120), it causes endpoint devices in the OWC network (100) to advertise their presence.

14 Claims, 9 Drawing Sheets

INTERFERENCE MITIGATION

CROSS-REFERENCE TO PRIOR APPLICATIONS

This application is the U.S. National Phase application under 35 U.S.C. § 371 of International Application No. PCT/PCT2021/065135, filed on Jun. 7, 2021, which claims the benefit of European Patent Application No. 20179609.1, filed on Jun. 12, 2020. These applications are hereby incorporated by reference herein.

TECHNICAL FIELD

The present disclosure relates to a control system, access points, and methods for an optical wireless communications, OWC, network.

BACKGROUND

To enable more and more electronic devices like laptops, tablets, and smartphones to connect wirelessly to the Internet, wireless communication confronts unprecedented requirements on data rates and also link qualities, and such requirements keep on growing year over year, considering the emerging digital revolution related to Internet-of-Things (IoT). Radio frequency technology like Wi-Fi has limited spectrum capacity to embrace this revolution. In the meanwhile, light fidelity (Li-Fi) is drawing more and more attention with its intrinsic security enhancement and capability to support higher data rates over the available bandwidth in visible light, Ultraviolet (UV), and Infrared (IR) spectra. Furthermore, Li-Fi is directional and shielded by light blocking materials, which provides it with the potential to deploy a larger number of access points, as compared to Wi-Fi, in a dense area of users by spatially reusing the same bandwidth. These key advantages over the wireless radio frequency communication make Li-Fi a promising solution to mitigate the pressure on the crowded radio spectrum for IoT applications. Other benefits of Li-Fi include guaranteed bandwidth for a certain user, and the ability to function safely in areas otherwise susceptible to electromagnetic interference. Therefore, Li-Fi is a very promising technology to enable the next generation of immersive connectivity.

There are several related terminologies in the area of lighti-based communication. Visible-light communication (VLC) transmits data by intensity modulating optical sources, such as light emitting diodes (LEDs) and laser diodes (LDs), faster than the persistence of the human eye. VLC is often used to embed a signal in the light emitted by an illumination source such as an everyday luminaire, e.g. room lighting or outdoor lighting, thus allowing use of the illumination from the luminaires as a carrier of information. The light may thus comprise both a visible illumination contribution for illuminating a target environment such as a room (typically the primary purpose of the light), and an embedded signal for providing information into the environment (typically considered a secondary function of the light). In such cases, the modulation may typically be performed at a high enough frequency to be beyond human perception, or at least such that any visible temporal light artefacts (e.g. flicker and/or strobe artefacts) are weak enough and at sufficiently high frequencies not to be noticeable or at least to be tolerable to humans. Thus, the embedded signal does not affect the primary illumination function, i.e., so the user only perceives the overall illumination and not the effect of the data being modulated into that illumination.

The IEEE 802.15.7 visible-light communication personal area network (VPAN) standard maps the intended applications to four topologies: peer-to-peer, star, broadcast and coordinated. Optical Wireless PAN (OWPAN) is a more generic term than VPAN also allowing invisible light, such as UV and IR, for communication. Thus, Li-Fi is generally accepted as a derivative of optical wireless communications (OWC) technology, which makes use of the light spectrum in a broad sense to support bi-directional data communication.

In a Li-Fi system, the signal is embedded by modulating a property of the light, typically the intensity, according to any of a variety of suitable modulation techniques. For communication at high speed, often Infrared (IR) rather than visible light communication is used. Although the ultraviolet and infrared radiation is not visible to the human eye, the technology for utilizing these regions of the spectra is similar, although variations may occur as a result of wavelength dependencies, such as in the case of refractive indices. In many instances there are advantages to using ultraviolet and/or infrared as these frequency ranges are not visible to the human eye, and more flexibility can be introduced in the system. Of course, ultraviolet quanta have higher energy levels compared to those of infrared and/or visible light, which in turn may render use of ultraviolet light undesirable in certain circumstances.

Based on the modulations, the information in the light can be detected using any suitable light sensor. For example, the light sensor may be a photodiode. The light sensor may be a dedicated photocell (point detector), an array of photocells possibly with a lens, reflector, diffuser or phosphor converter (for lower speeds), or an array of photocells (pixels) and a lens for forming an image on the array. E.g., the light sensor may be a dedicated photocell included in a dongle which plugs into a user device such as a smartphone, tablet or laptop, or the sensor may be integrated and or dual-purpose, such as an array of infrared detectors initially designed for 3D face recognition. Either way this may enable an application running on the user device to receive data via the light.

SUMMARY

According to a first aspect disclosed herein, there is provided a control system for an optical wireless communications, OWC, network in which the OWC network comprises a plurality of access points for communicating with a plurality of endpoint devices via modulated light, the control system being configured to: in response to receiving a report indicating a timeslot during which a first one of said access points detected an event indicative of interference, transmit an indication of said timeslot to at least one other access point to cause said other access point to provide to the control system identifiers of the or each endpoint device that is registered with said other access point and was communicating with said other access point using said timeslot; and in response to receiving an identifier of a single endpoint device from said other access point, determine the single endpoint device identified by said identifier as a cause of the interference experienced at the first access point; and in response to receiving identifiers of plural endpoint devices from one or more of said other access points, cause said one or more other access points to instruct endpoint devices registered to said one or more other access points to advertise their presence.

In an example, the EP was communicating, or attempting to communicate, with the said other access point during said timeslot.

In an example, the control system is configured to transmit an indication of said timeslot to a closest one (or more) of the other access points to the first access point.

The closest other one or more access points may be, for example, the other access point(s) which is(/are) located nearest (physically closest) to the first access point. The closest other access point(s) may be, for example, the other access point(s) having the greatest overlapping coverage with the first access point. This information may be configured into the control system by an installer. Alternatively the control system may learn which other access points have overlapping coverage area from reporting of end points on the advertisement detection of other access points while associated with (and so implicitly overlap the coverage area of) the first access point. (Additionally, the control system may learn how near a nearby other access point is, if the reporting of the EPs includes the received signal power of detected advertisements of other access points.) The coverage of an access point (or end point for that matter) can be construed in either two-dimensions as a coverage area or three dimensions translating into a coverage volume. In practical systems the assessment in two-dimensions already provides a simplified, yet satisfactory approximation of the coverage volume.

There may be more than one closest other access point. For example, two or more other access points may be within a threshold distance from the first access point. The other access points may even be at the same or substantially the same distance from the first access point. As another example, two or more other access points may have more than a threshold overlapping coverage with the first access point. The other access points may even have the same or substantially the same overlapping coverage with the first access point. The control system may be configured to transmit an indication of said timeslot to each of the closest other access points.

In an example, the control system is configured to transmit an indication of said timeslot to at least one other access point physically located within a threshold distance of the first access point. The threshold distance may be, for example, one or two metres, ten metres, or may. In general, the threshold distance may be equal or substantially equal to the maximum reception field of view of the access point (or average or more than one, e.g. all, of the access points).

In an example, the control system is configured to transmit an indication of said timeslot to at least one other access point having more than a threshold overlapping coverage with the first access point.

In an example, the control system is configured to transmit an indication of said timeslot to all other access points in the same room of a building as the first access point.

In an example, the control system is configured to transmit an indication of said timeslot to all other access points in the OWC network.

In an example, the control system is configured to: in response to receiving a report from an endpoint device registered to one of the access points indicating interference by at least one neighbour access point, cause the endpoint device to advertise its presence. In these examples, the endpoint device is the device which initially determines potential interference, in contrast to other examples in which the access point initially determines potential interference. An advantage is therefore that upstream interference (by an access point) and downstream interference (by an endpoint device) are handled separately.

In an example, the control system is implemented at the first access point. In general, the control system can be implemented at the first access point, as a central lighting controller, or in a manner distributed manner over the access points int the OWC network.

In some examples, the control system may be implemented as a central entity whereby its functionality covers multiple access points. This central entity may be comprised in an AP, but it may also be comprised in a separate unit not comprised in an AP.

In other examples, the control system may be implemented in a distributed manner whereby its functionality is comprised in the access points. In that case each access point comprises a part of the control system that is relevant for itself, e.g. information of its nearest other access point or access points.

In an example, the control system is implemented in a distributed manner across a plurality of the access points.

According to a second aspect disclosed herein, there is provided a method performed by a control system of an optical wireless communications, OWC, network comprising a plurality of access points for communicating with a plurality of endpoint devices via modulated light, the method comprising: receiving a report indicating a timeslot during which a first access point detected an event indicative of interference; in response to receiving said report, transmitting an indication of said timeslot to at least one other access point to cause said other access point to provide to the control system identifiers of the or each endpoint device that is registered with said other access point and was communicating with said other access point using said timeslot; in response to receiving an identifier of a single endpoint device from said other access point, determining the single neighbour endpoint device identified by said identifier as a cause of the interference experienced at the first access point; and in response to receiving identifiers of plural neighbour endpoint devices from one or more of said other access points, causing said one or more other access points to instruct endpoint devices registered to the one or more other access points to advertise their presence.

In an example, the method comprises: in response to receiving a report from an endpoint device registered to one of the access points indicating interference by at least one neighbour access point, causing the endpoint device to advertise its presence.

According to a third aspect disclosed herein, there is provided an access point for an optical wireless communication, OWC, network for communicating with at least one endpoint device via modulated light, said access point being configured to: in response to receiving, from a control system, an indication of a timeslot during which another access point detected an event indicative of interference: determine an endpoint device that is registered to said access point and was communicating with said access point using said timeslot; and provide an identifier of said endpoint device to the control system.

According to a fourth aspect disclosed herein, there is provided a method performed by an access point of an optical wireless communication, OWC, network, the method comprising: in response to receiving, from a control system, an indication of a timeslot during which another access point detected an event indicative of interference: determining an endpoint device that is registered to said access point and was communicating with the access point using said timeslot; and providing an identifier of said endpoint device to the control system.

According to a fifth aspect disclosed herein, there is provided an optical wireless communication, OWC, system comprising the control system of the first aspect and the plurality of access points.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

In an optical wireless communication (OWC) network, fast and effective interference handling requires fast detection of the cause of interference. Interference detection as known in the prior art is based on devices cyclically sending out short frames ("advertisements" or "adverts") carrying an identifier identifying the device.

An OWC network may comprises multiple access points (APs) and multiple endpoints (EPs), often this type of network is referred to as a multi-point to multi-point type of network, wherein there are multiple access points that may provide network access services to multiple endpoints residing in the coverage areas of the access points. If many EPs occur in a dense area, identification may take a relatively long time or otherwise lead to substantial overhead due to frequent advertising. The present disclosure proposes event triggering for instructing EPs to advertise their presence rather than a cyclic scheme. This enables short latency for resolving an upstream interference cause. It can also reduce network traffic. This can also minimise power consumption by the EPs, which is particularly important in EPs that are battery-powered.

Put differently, the present disclosure relates more to determining the network topology, and not to interference mitigation techniques per se. Some examples of the present disclosure enable network topology determination with short latency while also avoiding collisions in the limited available time.

In general terms, an example solution as provided herein may be summarised as follows.

The control system (e.g. LiFi controller) receives a report from an AP indicating a timeslot (e.g. a timeslot in a MAC cycle, as discussed in more detail below) at which uplink interference occurs. Upon receiving such report, the control system sends an interference-check-request (including an indication of the timeslot in the MAC-cycle and if necessary, an indication of the MAC-cycle) to the AP's neighbour APs. Upon receiving an interference-check-request, an AP checks whether an EP registered to the AP has been transmitting in the indicated timeslot and replies to the request indicating whether this was the case or not thereby (optionally) including the identifier of the EP. There are various options regarding the responses. For example:

Option 1: if the AP has detected that an EP was transmitting in a timeslot as indicated by an interference-check-request, the AP instructs the EP to send an advertisement.

Option 2: upon receiving a reply from an AP on an interference-check-request indicating that an EP was transmitting, the control system sends an EP advertisement request to the AP (including the identifier of the EP) on which the AP instructs the EP to send an advertisement.

Figure 1:
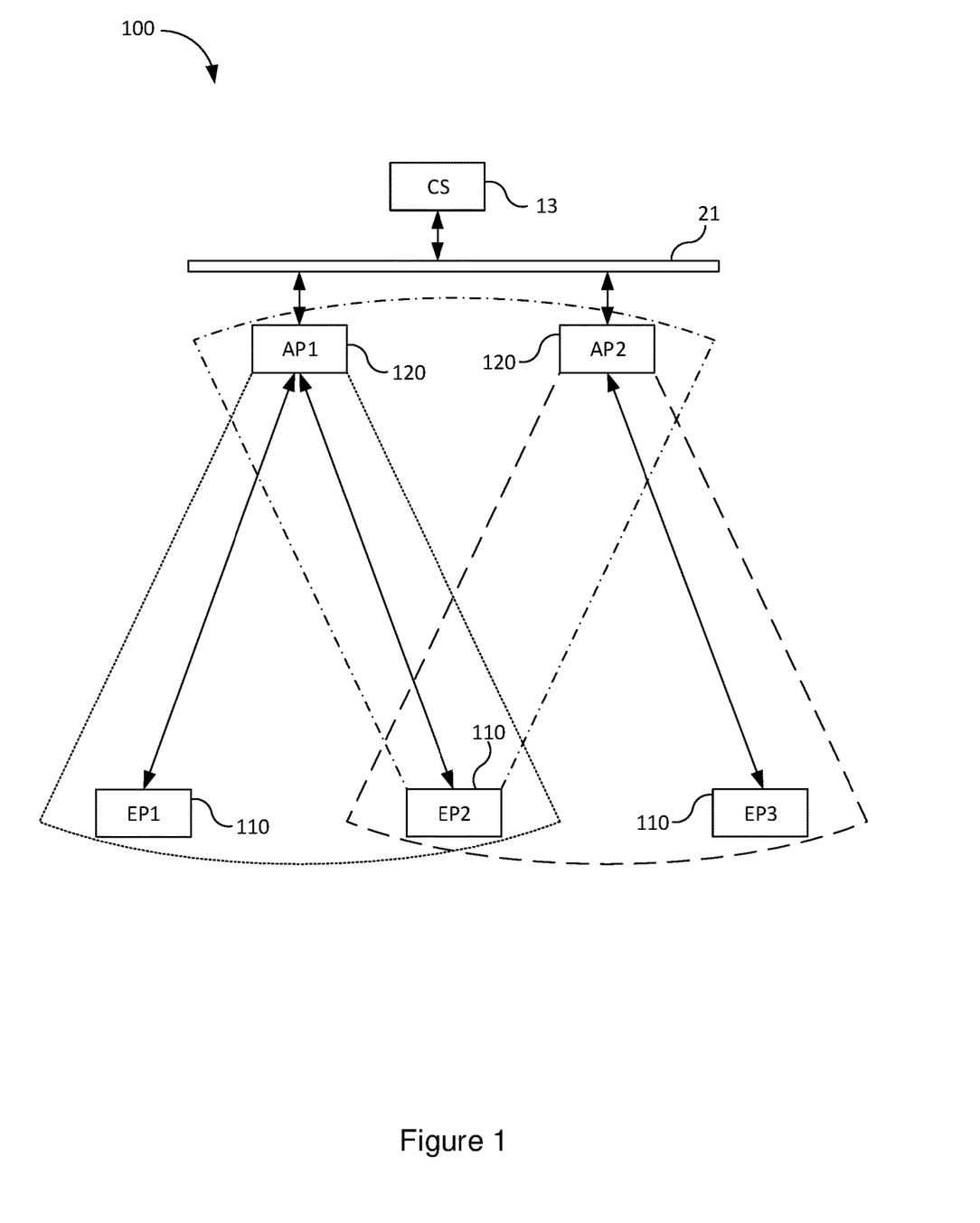
FIG. 1 shows schematically an example of an OWC network system.

FIG. 1 shows schematically an example of an OWC network system 100 (also referred to herein as OWC network 100). The terms OWC and LiFi are often used interchangeably. Other common terms include Visible Light Communications (VLC) and Free-Space Optical (FSO) communication.

The OWC network 100 comprises a plurality of access points (APs) 120 and one or more endpoint devices (EPs) 110. Also shown are a backbone 21 and a control system 13, which may be separate devices and arrangements or may be considered part of the OWC network 100. It is appreciated that the OWC network 100 shown schematically in FIG. 1 is simplified for the purposes of explanation and that the OWC network 100 may comprise further access points and further endpoint devices, as well as additional elements such as, for example, an IP router, ethernet switch, etc. The OWC network 100 may also be connected to an external network, also not shown in FIG. 1.

The APs 120 and control system 13 are operatively coupled via the backbone 21. The backbone 21 provides a stable and high-speed communication link, which can be a wired connection, such as Ethernet, or a wireless connection based on radio frequency (RF) or millimetre-wave. The backbone connection can also be another kind of optical wireless link that is different from the one that an end point is using in the optical multi-cell wireless network. One example of another kind of optical wireless link can be free space point-to-point optical links.

EPs 110 are or include end user modems that facilitate end devices to connect to the OWC network 100. Nowadays, an EP 110 is typically a dedicated entity connected to or incorporated in a laptop computer or other end device. In the future, an EP 110 may be partially or fully integrated to a smart phone, a tablet, a computer, a remote controller, a smart TV, a display device, a storage device, a home appliance, or another smart electronic device.

The APs 120 and EPs 110 communicate via OWC signals. To that end, each AP 120 and each EP 110 comprises at least one optical front end for transmitting and receiving OWC signals. For example, each AP 120 may comprise an OWC transceiver (TRX) for transmitting OWC signals to and receiving OWC signals from the EPs 110. Similarly, each EP 110 may comprise an OWC TRX for transmitting OWC signals to and receiving OWC signals from an AP 120.

Each optical front end provides an OWC connection within a field of view (FoV), or coverage, of that optical front end. When, and only when, a first device (e.g. an EP 110) is located in the coverage of a second device (e.g. an AP 120), is the first device able to receive OWC signals from the second device (e.g. AP 120).

In FIG. 1, it is assumed that each AP 120 and EP 110 comprises a single optical front end, the FoVs of which are illustrated as sectors of a circle. It is appreciated that in the real world each FoV will generally be a three-dimensional volume, the shape of which will depend on various factors including, for example, the layout of the environment in which the AP 120 or EP 110 is installed, the physical shape and construction of the AP 120 or EP 110 itself, the orientation of the AP 120 or EP 110 within the environment, etc.

In operation, at any one point in time, each EP 110 is selectively associated to and synchronized with a respective one of the APs 120. That is, each EP 110 is registered with a respective one of the APs 120. This is illustrated in FIG. 1 using arrows indicating that EP1 and EP2 are associated with AP1 and that EP3 is associated with AP2.

Basically, an EP 110 can be connected to an AP 120 via a bidirectional optical link or a hybrid downlink and uplink. Note that here the downlink stands for the communication link from the AP 120 to the EP 110, and the uplink stands for the communication link from the EP 110 to the AP 120. A bidirectional optical link enables a relatively symmetrical connection between the EP 110 and the AP 120. Hence, both downlink and uplink enjoy the same advantages of Li-Fi communication as addressed above.

Where the coverage areas of the domains overlap, interference of the communication between APs 120 and EPs 110 can occur. Coordination of the APs 120 is needed to handle the interference. In this example, this is the responsibility of the control system 13.

There are two types of interference to be considered in the present case:

Uplink (or "upstream") interference: an EP 110 transmits a signal to the AP 120 to which the EP 110 is registered while another EP 110 is transmitting to its own AP 120, which can result in uplink interference to signals from the first EP 110 at the AP 120 to which the first EP 110 is registered.

Downlink (or "downstream") interference: an EP 110 that is in the overlapping coverage area of multiple optical downlinks from a number of APs 120 experiences interference if these APs 120 transmit signals (typically signals for their own registered EPs) at the same time that the EP 110 is scheduled to receive signals from its own AP.

The upstream overlapping coverage area of two EPs (EP2 and EP3 in FIG. 1) can defined as the area or region at which an AP (AP2 in in FIG. 1) can receive an OWC signal from both EPs.

The downstream overlapping coverage area of two APs (AP1 and AP2 in FIG. 1) can be defined as the area or region at which an EP (EP2 in FIG. 1) can receive an OWC signal from both APs.

In the setup shown in FIG. 1, downlink interference for EP2 can occur when AP1 and AP2 send at the same time. Uplink interference for AP2 can occur when EP2 and EP3 send at the same time.

The control system 13 performs various functionalities including, in various examples, deriving information about the topology and neighbour relationship, and deciding scheduling among different APs 120 for interference suppression. The control system 13 may also provide a user interface that allows a user or admin, such as an IT manager, to configure the control system to influence schedules among multiple APs 120, monitor reports from these APs 120, and/or to derive further statistical information about the system performance.

In the example shown in FIG. 1, the control system 13 is implemented as a dedicated OWC network controller (i.e. in a centralized manner) which is connected to the plurality of APs 120 in the OWC network 100 via the backbone 21. However, it will be appreciated that the control system 13 is a functional block for performing the various tasks described herein and may be implemented in one of the APs 120 or in a decentralized manner, such as across the APs 120, as in other examples described below.

Figure 2:
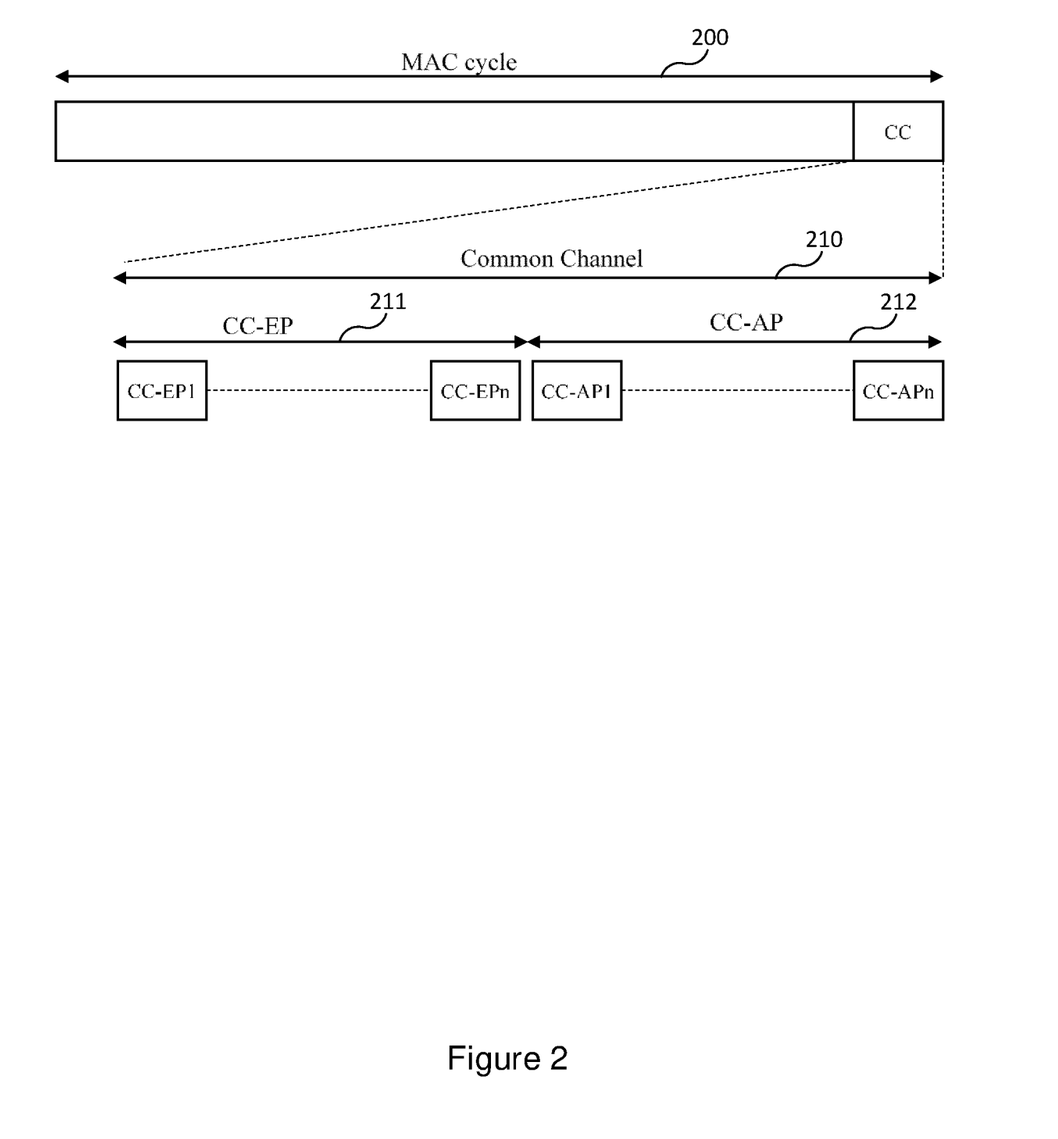
FIG. 2 shows schematically an example of a MAC cycle.

The OWC network 100 in general handles interference using time-division multiple access (TDMA). TDMA is based on a time-division multiplexing scheme, where access to the radio resource is scheduled in the time domain and different time slots are assigned to different transmitters in a typically cyclically repetitive frame structure or MAC cycles (also called a MAC frame). An example MAC cycle 200 is shown in FIG. 2.

For interference handling the control system 13 determines for each AP 120 at which timeslot(s) the AP 120 is allowed to transmit to which EP 110 and at which timeslot(s) the EP 110 is allowed to transmit to the AP 120. These allowed up-link and down-link timeslots may be the same for an EP 110. The control system 13 communicates these timeslot allowances to the APs 120, e.g. by broadcasting a message to all its APs 120, whereby this message comprises an indication of the assigned timeslot(s) for each AP 120 and for each of its associated EPs 110. Alternatively or additionally, the control system 13 may also address each AP 120 separately and communicate the relevant information directly to that AP 120.

The MAC cycle 200 comprises a common channel 210 (shown in this example at the end of the MAC cycle 200) which provides for interference handling. Access to the common channel 210 can be contention based, contention free by coordinated scheduling, or a by combination of both. The common channel 210 is split into two parts, a first part 211 for the APs (CC-AP) and a second part 212 for the EPs (CC-EP). This is returned to below.

The MAC cycles are synchronized between the APs 120. Various methods for synchronization are known. For example, the APs 120 may synchronize to a common time base, e.g. using a synchronization handshake, via a reference clock distributed over the network (such as synchronous Ethernet clocks), or via a dedicated synchronization server in the network, or derived from a common signal, such as the zero crossing of the mains power. A specific example of a synchronization protocol is the Precision Time Protocol (PTP), IEEE 1588v2. The PTP provides a sub-microsecond accuracy, which is sufficient for inter G.vlc domain MAC alignment (where G.vlc refers to ITU-T G.9991). To keep the PTP accuracy, support from an Ethernet switch is necessary, which should also be PTP capable. To keep the PTP accuracy, any element in the Ethernet network must handle PTP so the switch selected for any deployment must support and be configured to operate in the PTP mode accordingly.

In some examples, there may be a dedicated Li-Fi synchronization server connected to the system, which is in charge of synchronizing (or aligning) the G.vlc MAC cycles 200 of the different G.vlc domains. This may be needed to align some common time slots for detecting neighbouring APs 120 and avoiding interference to an EP 110 located in the overlapping area of neighbouring APs 120. In other examples, this functionality may be implemented by the (central or distributed) control system 13 itself.

For downstream detection, an AP initially accesses the CC-AP by randomly choosing a slot. Once the LC has learned or configured which APs can interfere, it allocates a slot to each AP to avoid interference. If the LC has partial information on the interference map, it allocates a subset of slots to each AP from which the AP randomly selects to mitigate interference.

For upstream detection, an EP randomly chooses a slot in the CC-EP. Since the EPs are mobile, this access can be less controlled by the LC, because of the locational dynamic of the EPs. However, each AP can instruct its registered EPs when to send a presence advertisement and can apply e.g. a round robin scheme to decide which EP to instruct at which time.

Put simply, the control system 13 is able to mitigate interference occurring within the OWC network 100 by separating transmissions by potentially interfering devices in time. To perform this interference mitigation, however, the control system 13 requires information regarding the topology of the OWC network 100, in particular which devices are in reception of signals from which other devices or are transmitting to which other devices, and at which times. This information may be referred to as an "interference map".

One way of determining (at least a part of) the network topology is through the use of advertisements (also known as beacons). There are two different types of advertising, AP advertising and EP advertising. Put simply, in AP advertising the APs advertise their presence and then the EP(s) can let the control system 13 know which APs they can "see", and in EP advertising the EPs advertise their presence and then the APs can let the control system 13 know which EPs they can "see".

An AP 120 advertises its presence by transmitting a SMAP-D frame in CC-AP. An EP 110 advertises its presence by transmitting a SMAP-D frame in CC-EP. A SMAP-D frame is a short MAP-D frame only containing a header that carries the required information.

In the following examples, for the sake of clarity, a simple OWC network 100 is shown which comprises a local AP 120a and a neighbour AP 120b. It is assumed that a single EP 110 is registered to (only) the local AP 120a. One or more other EPs (not shown) may be registered to the neighbour AP 120b. The local AP 120a and neighbour AP 120b are operatively coupled via the backbone 21 to the control system 13. It is appreciated that there maybe more APs, more EPs, or both.

Figure 3:
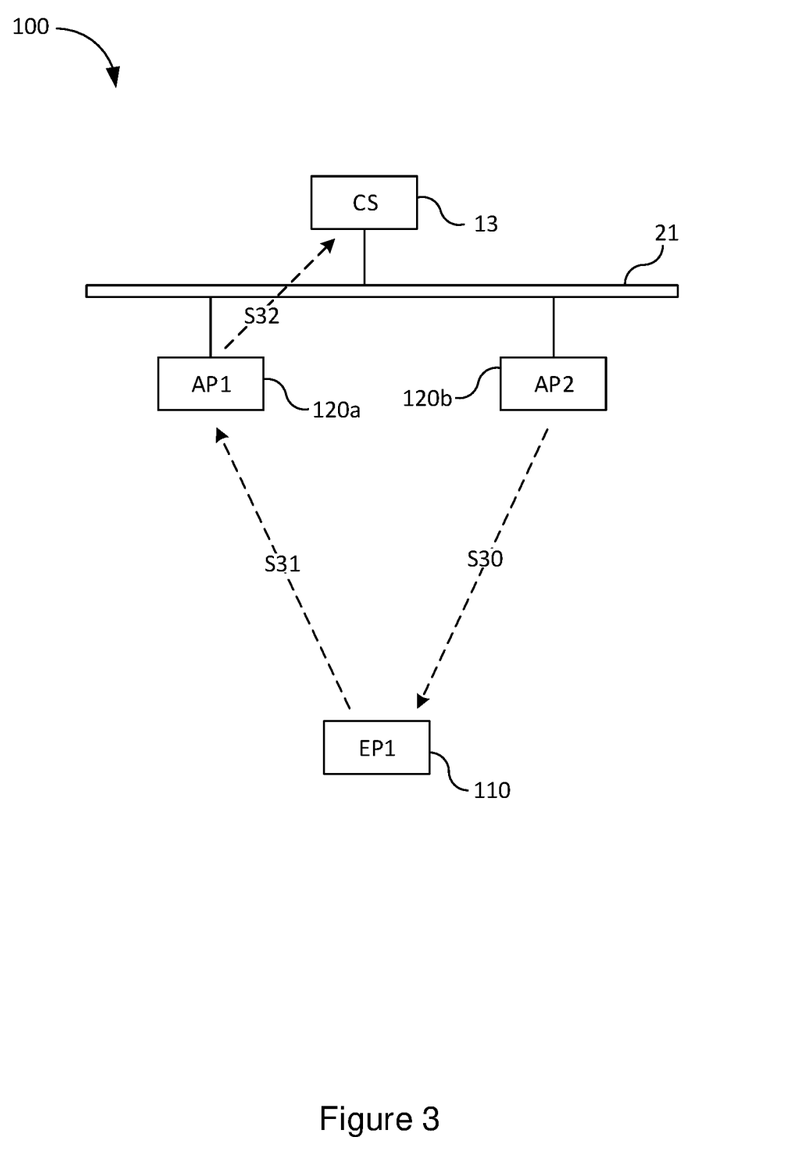
FIG. 3 shows schematically a first example of AP advertising.

FIG. 3 shows schematically an example of AP advertising. This example illustrates the principle of an OWC controller (control system 13) detecting whether an EP registered to an AP (local AP 120a) is in the coverage area of another AP (neighbour AP 120b).

At S30, the neighbour AP 120b advertises its presence. This comprises broadcasting an advert or "beacon" identifying the neighbour AP 120b which may be, as mentioned above, a SMAP-D frame. The local AP 120a may also advertise its presence. The EP 110 receives adverts from any APs which are in its coverage area (including the neighbour AP 120b in this example).

At S31, the EP 110 sends a report to its local AP 120a indicating the (neighbour) APs 120b from which it received adverts.

At S32, the local AP 120a forwards this report to the control system 13. The control system 13 is thereby informed of the AP(s) having a FoV or coverage area in which the EP is located (neighbour AP 120b in this example). The control system 13 can then use this information to perform one or more interference mitigation steps. For example, in the arrangement in FIG. 3, the control system 13 can determine that the neighbour AP 120b is a potential source of interference for the EP 110 and therefore coordinate communications from the local AP 120a and the neighbour AP 120b in order to avoid this.

Figure 4:
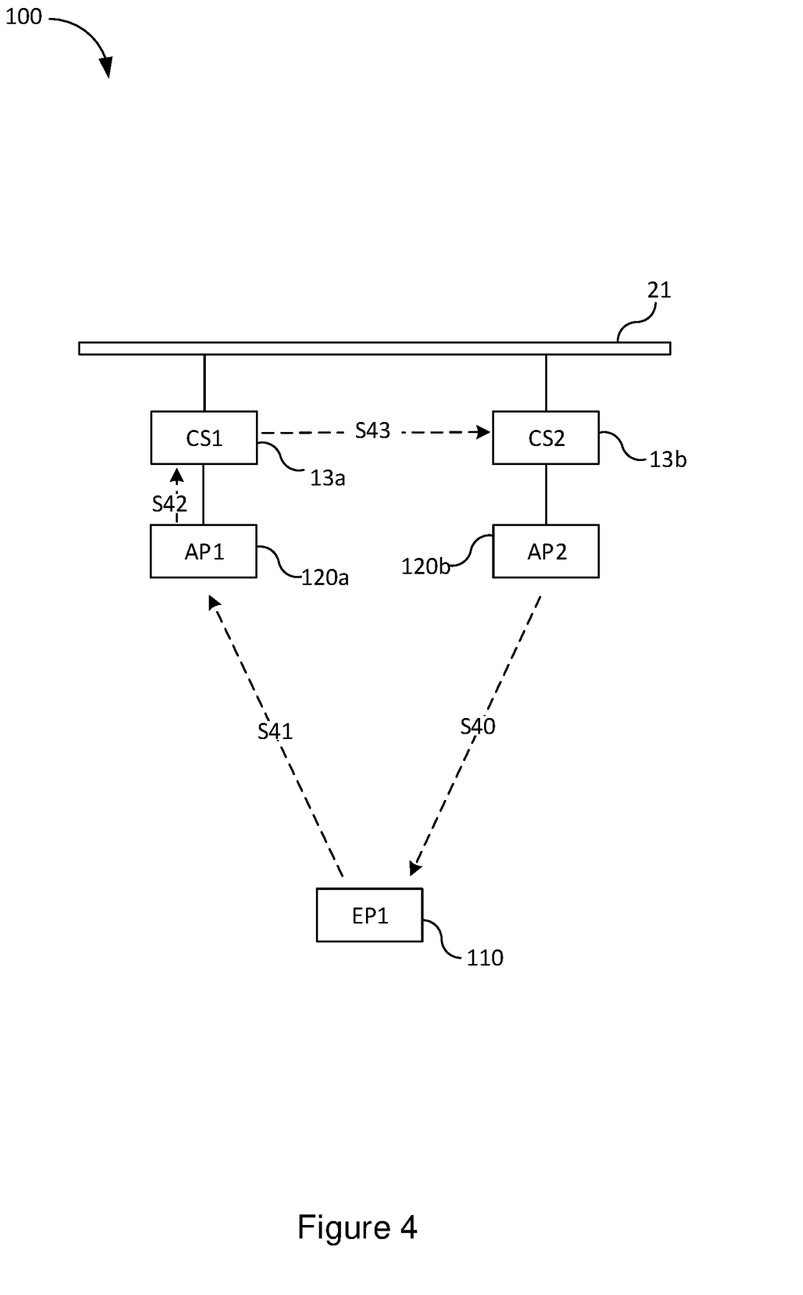
FIG. 4 shows schematically a second example of AP advertising.

AP advertising can also be performed when the control system 13 is implemented in a distributed manner, as illustrated schematically in FIG. 4. The system 100 in this example is similar to that in the previous example, except that each AP 120 has a partition of the control system 13. Specifically, the local AP 120a has a local part of the control system 13a and the neighbour AP 120b has a neighbour part of the control system 13b. This example illustrates the principle of a partitioned and distributed control system 13 detecting whether an EP registered to an AP (local AP 120a) is in the coverage area of another AP (neighbour AP 120b).

At S40, the neighbour AP 120b advertises its presence, as above.

At S41, the EP 110 sends a report of any received adverts to its local AP 120a, as above.

At S42, the local AP 120a forwards this report to the local part of the control system 13a.

At S43, the local part of the control system 13a forwards the report to the neighbour part of the control system 13b.

Hence, all parts of the control system 13 are informed of the AP(s) having a FoV or coverage area in which the EP 110 is located, and can take appropriate measures to mitigate interference, as mentioned above.

Figure 5:
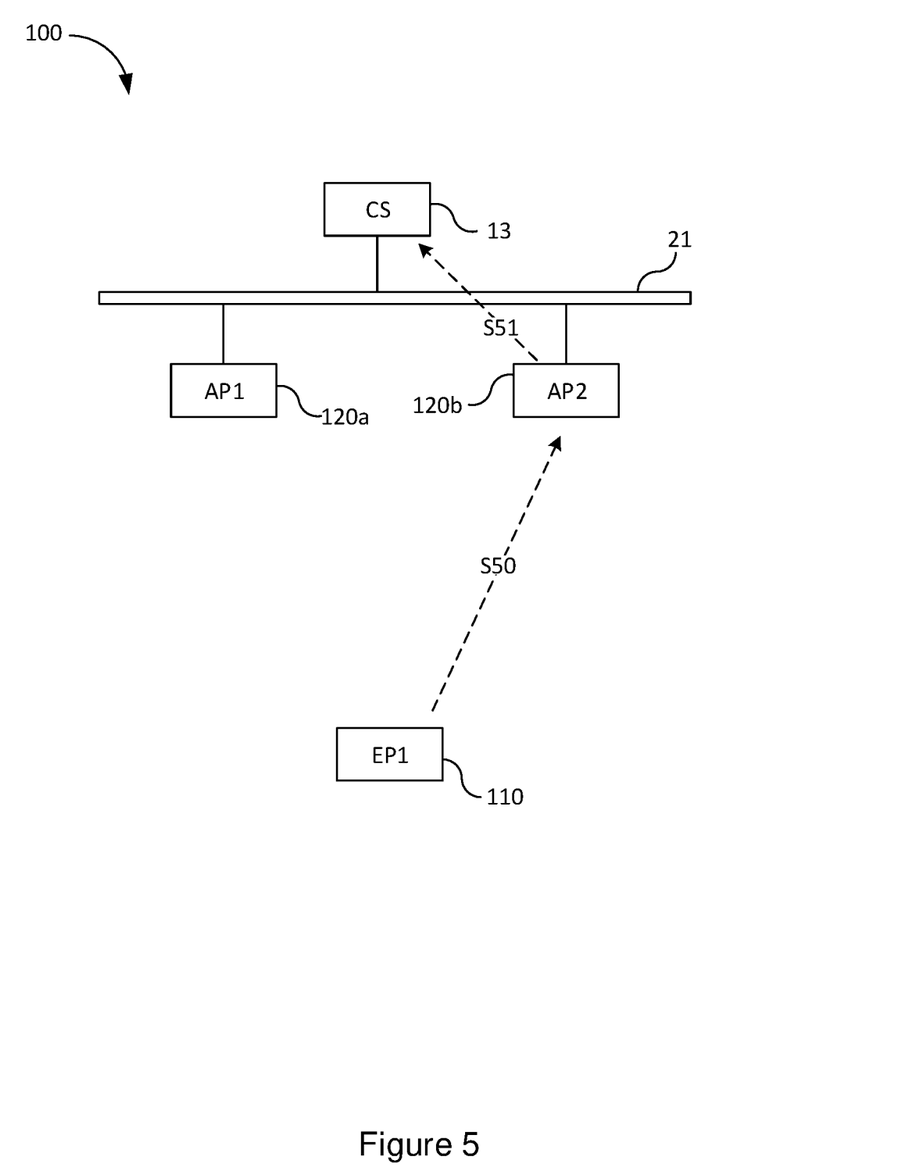
FIG. 5 shows schematically a first example of EP advertising.

FIG. 5 shows schematically an example of EP advertising.

At S50, the EP 110 advertises its presence. This comprises broadcasting an advert or "beacon" identifying that EP 110. As mentioned above, this may be a SMAP-D frame. The APs receive adverts from any EPs which are in its coverage area. In FIG. 5, the neighbour AP 120b is shown receiving the advert from the EP 110. It is appreciated that the local AP 120a may also receive this advert. However, this is not unexpected as the EP 110 is registered to the local AP 120a.

At S51, the neighbour AP 120b sends a report to the control system 13 indicating the EPs that are not registered to that neighbour AP 120b and from which the neighbour AP 120b received adverts (EP 110 in this example).

The control system 13 is thereby informed of which EP FoVs the neighbour AP 120b is in located within. Similarly to above, the control system 13 can then use this information to perform one or more interference mitigation steps. For example, in the arrangement in FIG. 5, the control system 13 can determine that the EP 110 (which is not registered to the neighbour AP 120b) is a potential source of interference for the neighbour AP 120b.

Figure 6:
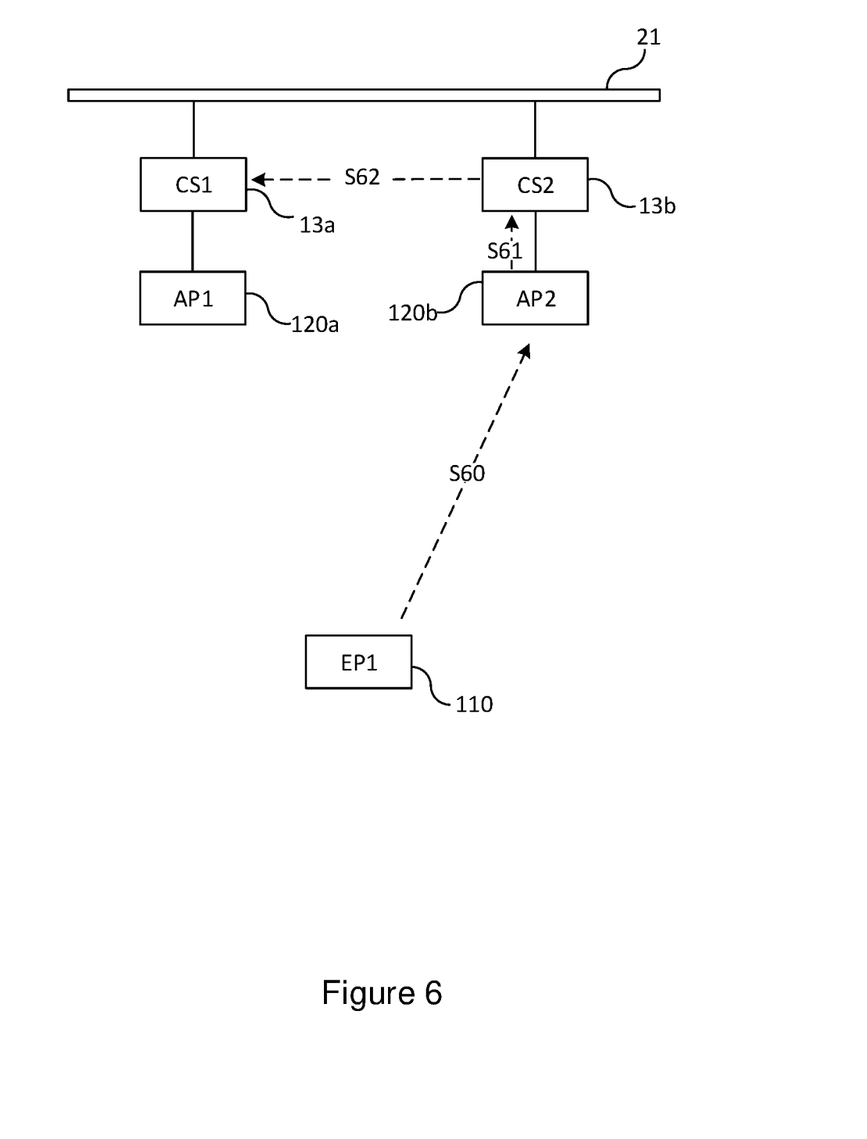
FIG. 6 shows schematically a second example of EP advertising.

EP advertising can also be performed when the control system 13 is implemented in a distributed manner, as illustrated schematically in FIG. 6.

In this case, the EP 110 advertises as before, at S60. The neighbour AP 120b sends the report at S61 to the neighbour part of the control system 13b. At S52, the neighbour part of the control system 13b forwards the report to the local part of the control system 13a.

For the upstream advertisements by EPs 110 (as in the examples of FIGS. 5 and 6), the problem can be more severe than for downstream advertisements by APs 120 (as in the examples of FIGS. 3 and 4), because the density of EPs 110 can be higher than for APs 120. For fast interference handling, fast detection of the interference cause is needed. In the prior art, to enable this, the presence advertising happens as frequently as possible. However, many collisions can occur if many EPs 110 send an advertisement in the available limited time (CC-EP 221) at every MAC cycle 200. To mitigate these collisions, the frequency of an EP 110 accessing the CC-EP 221 can be limited under control of the AP 120 to which the EP 110 is registered. For example, the AP 120 may apply a round robin scheme to assign which EP 110 may access the CC-EP 221 in which MAC cycle 200. However, the present disclosure recognises that this leads to a larger latency of detecting which APs 120 are in the upstream coverage area of which EPs 110.

The present disclosure proposes to address these issues by triggering the EPs to advertise their presence based on events rather than on cyclic or periodical timing as used in known arrangements. The advertisements by the EPs can then still be used for the purposes of network topology determination and interference mitigation. One advantage of this is that it allows fast interference handling for those EPs that suffer or potentially will suffer from upstream interference by EPs registered to another AP. For example, an EP may be triggered to advertise earlier than it would otherwise have according to a cyclic timing. Another advantage is that it enables separate handling of upstream and downstream interference handling and improved performance due to better utilization of the streams.

An example is now described with reference to FIGS. 7 and 8.

Figure 7:
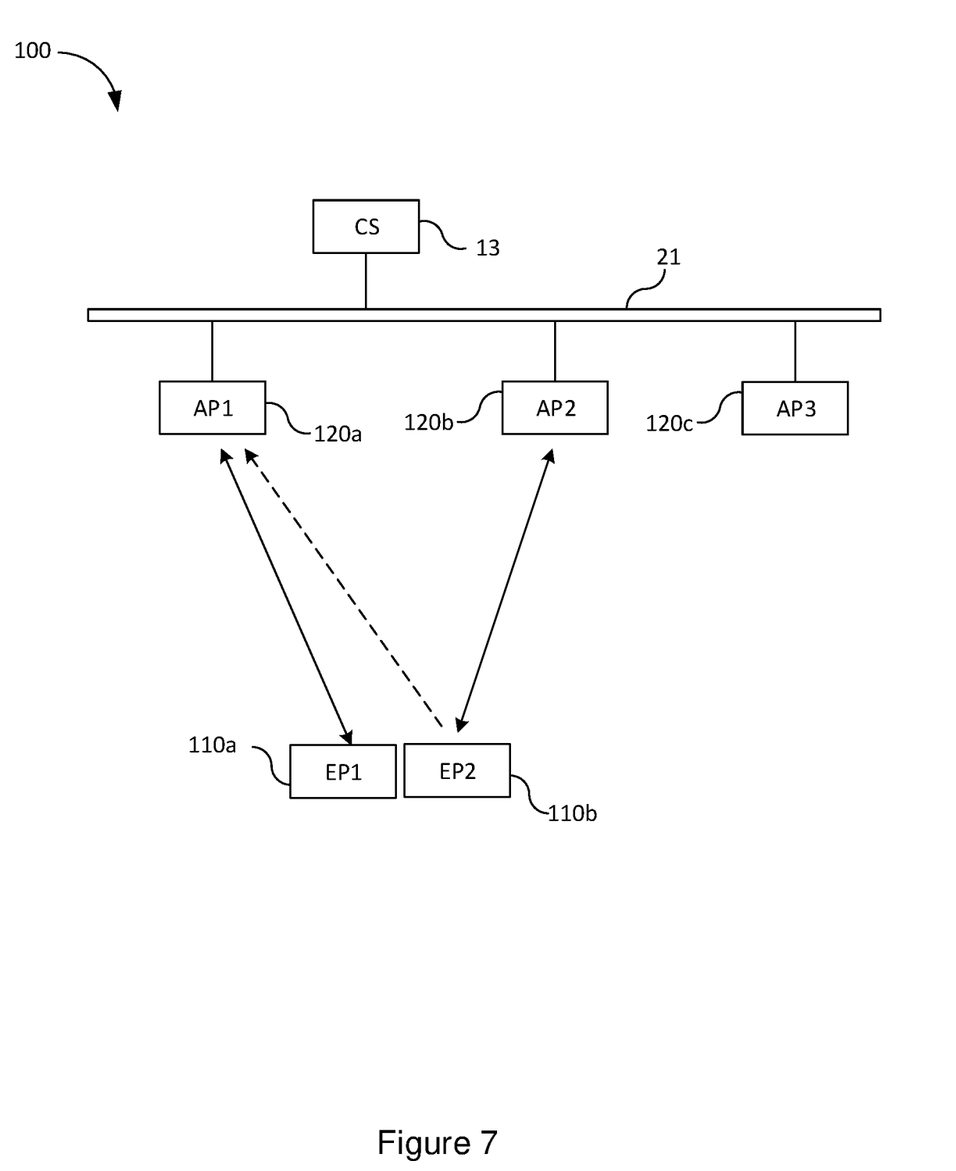
FIG. 7 shows schematically another example of an OWC network.

FIG. 7 shows schematically an OWC network 100 comprising a local AP 120*a*, first neighbour AP 120*b*, a second neighbour AP 120*c*, a local EP 110*a*, and a neighbour EP 120*b*. The local AP 120*a*, first neighbour AP 120*b* and second neighbour AP 120*c* are operatively coupled to a control system 13 via a backbone 21. The control system 13 is, in this example, a centrally-implemented control system (as in previous examples of FIGS. 1, 3 and 5) but it is appreciated that the control system 13 may in other examples be implemented in a distributed manner (as in the previous examples of FIGS. 4 and 6).

It is assumed, for the purposes of explanation, that the local EP 110*a* is registered to the local AP 120*a* and the neighbour EP 120*b* is registered to the neighbour AP 120*b*. This is indicated by solid arrows in FIG. 7. It is also assumed that the neighbour EP 120*b* is within a reception FoV of the local AP 120*a*. This is indicated by a dashed arrow in FIG. 7. Hence, the neighbour EP 110*b* is a potential source of interference for the local AP 120*a*.

Figure 8:
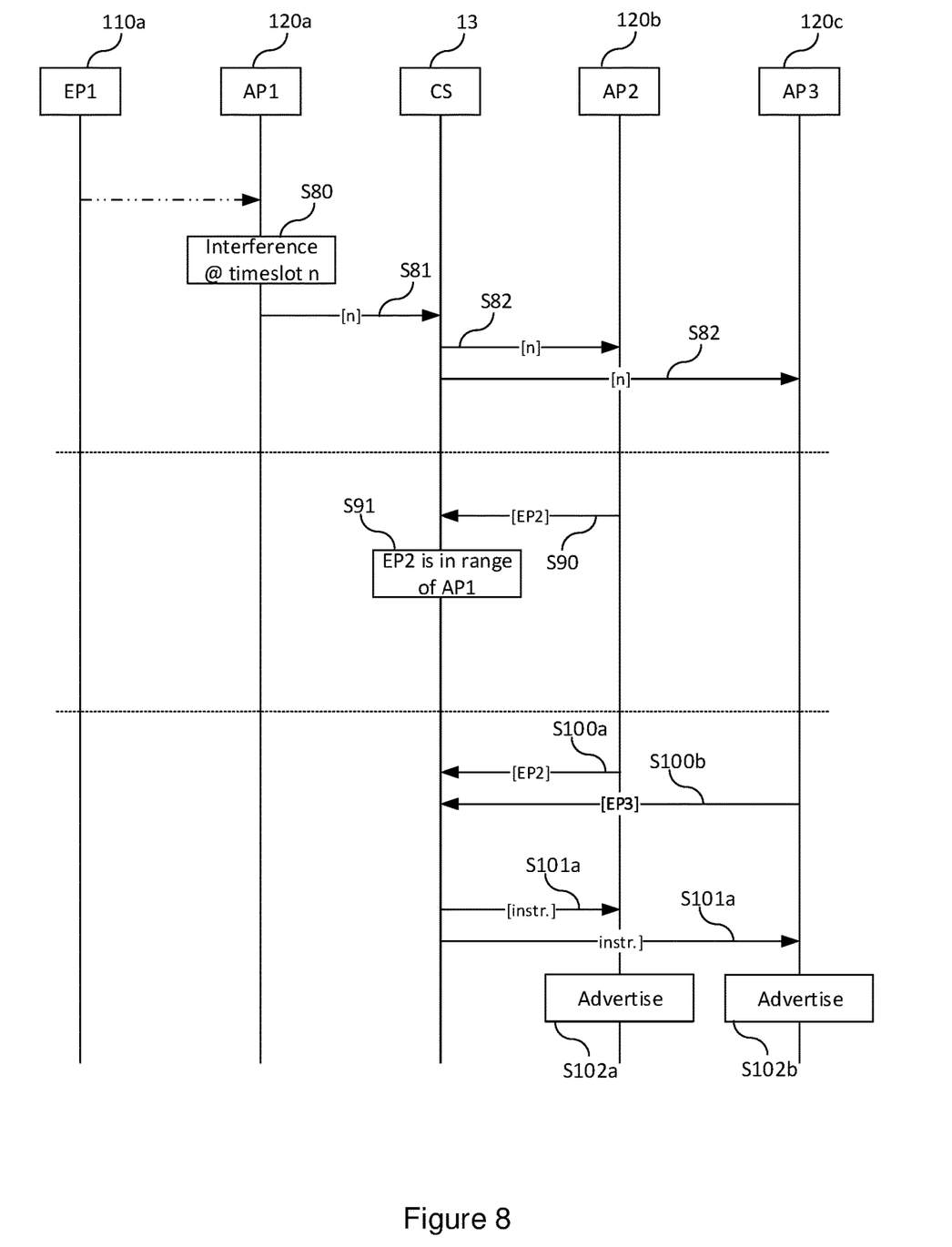
FIG. 8 shows schematically a first example method.

An example method is shown schematically in FIG. 8. The local AP 120*a* monitors reception of upstream communication from its registered EPs (local EP 110*a* in this example). At S80, the local AP 120*a* detects an event indicative of interference. For example, the AP 120*a* may determine that it has not received, or not correctly received, data from the local EP 110*a* (as indicated by broken arrow in FIG. 8). This can be regarded by the local AP 120*a* as potential interference from another EP registered to another AP (e.g. neighbour EP 110*b* in this example).

As discussed above, communication is synchronized into MAC cycles. Therefore, the local AP 120*a* can identify the timeslot within the one or more MAC cycle at which the event indicative of potential interference occurred.

At S81, the local AP 120*a* transmits a report to the control system 13 indicating the timeslot(s) at which the local AP 120*a* detected the event indicative of interference.

The timeslot may be indicated in the report as one or more of a start-time and end-time, a start-time and duration, a MAC cycle number and slot number, etc.). Using an indication format which requires the fewest number of bits has an advantage of minimising the amount of data transmitted within the OWC network 100. For example, the timeslots may have a predefined (fixed) duration and their occurrence (position) within a MAC cycle may be numbered sequentially. This allows the timeslot to be indicated in the report using a single number.

At S82, the control system 13 transmits an indication of the timeslot(s) to one or more neighbour APs. In this example, the control system 13 transmits the indication to both the first neighbour AP 120*b* and the second neighbour AP 120*c*. In general, the control system 13 may transmit the indication to all neighbour APs within the OWC network 100, all neighbour APs within the OWC network 100 that are geographically close to the local AP 120*a* (such as within a certain distance, such as within 1 metres, a few metres or 10s metres, etc.), only APs that are a nearest neighbour of the local AP 120*a*, such as within 1 to 3 meters, etc.

The neighbour APs are configured to, in response to receiving the indication of the timeslot(s), provide to the control system 13 identifiers of any neighbour EP devices that are registered with the neighbour AP and configured to communicate with the neighbour AP using said timeslot. This is advantageous because those EPs are potential causes of the interference identified by the local AP 120*a*, as they use the same timeslot.

Alternatively or additionally the neighbour APs are configured to, in response to receiving the indication of the timeslot(s), provide to the control system 13 identifiers of any neighbour EP devices that are registered with the neighbour AP and have been scheduled to communicate with the neighbour AP using said timeslot. This is advantageous because those EPs have caused potential interference identified by the local AP 120*a*, as they have used the same timeslot.

The control system 13 transmits an indication of the timeslot to at least one other AP 120 to cause that AP 120 to provide to the control system 13 identifiers of the or each EP 110 that is registered with that AP 120 and was communicating with that AP 120 using said timeslot (when interference occurred). That is, the AP 120 determines whether it has any registered EP(s) which used the indicated timeslot to communicate with the AP 120.

Put differently, the control system 13 surveys the neighbour APs to identify if they have any EP(s) which have been using or are currently using the indicated timeslot. There are then several possibilities regarding what response is received from the neighbour AP(s), as explained below.

In a first possibility, the control system 13 may not receive any response. For example, the control system 13 may not receive any response from the surveyed neighbour APs within a predetermined time limit. This may be the case, for example, if the source of interference at the local AP is due to a device which is not itself part of the OWC network 100 (e.g. it may be part of another network). In this case, the control system 13 may take no action if the interference at the indicated time slot only occurs a single time. If interference in that timeslot persists, however (i.e. the control system 13 receives at least a second indication of the same timeslot), and the control system 13 still does not receive any response from the surveyed neighbour APs (e.g. within the predetermined time limit), then the control system 13 may exclude that time slot for communication. That is, the control system 13 controls the local AP to avoid using that time slot for communication (entirely, or with the particular EP with which the interference was first identified).

In a second possibility, the control system 13 may receive an identifier that identifies only a single EP. In this case, the control system 13 determines that identified EP as a cause of the interference. This is shown in FIG. 8. At S90, the control system 13 receives an identifier of the neighbour EP 110*b* from the first neighbour AP 120*b* (and receives no response from any other neighbour APs). At S91, the control system 13 determines that the neighbour EP 110*b* is the cause of the interference initially identified by the local AP 120a. Note that the EP responsible for the interference experienced at the local AP 120a can be determined without any advertisements (e.g. by sending SMAP-D frames) being required. Therefore, network data usage is reduced. This reduction is in proportion to the number of neighbour EPs present in the network (which would have otherwise needed to advertise). This can also minimise power consumption by the EP, which is particularly important in EPs that are battery-powered.

In a third possibility, the control system 13 may receive identifiers identifying two or more EPs. In this case, the control system 13 causes the relevant neighbour APs to instruct those identified EPs to advertise their presence. This is shown in FIG. 8. At S100a, the control system 13 receives an indication of a first neighbour EP from the first neighbour AP 120b. At S100b, the control system 13 receives an indication of a second neighbour EP from the second neighbour AP 120c. This means that the first neighbour EP is using (or has been using) the timeslot in question to communicate with the first neighbour AP 120b and the second neighbour EP is also using (or has been using) the same timeslot to communicate with the second neighbour AP 120c. Both the first neighbour EP and the second neighbour EP are therefore potential causes of the interference at this timeslot identified by the local AP 120a.

In this third possibility, because the control system 13 cannot determine which neighbour EP is responsible for the interference, EP advertising is used. In the example shown, this comprises the control system 13 sending an instruction at S101a to the first neighbour AP 120b and an instruction at S101b to the second neighbour AP 120c. In response to the instruction, the first neighbour AP 120b and second neighbour AP 120c instruct their respective identified EPs to advertise. The first neighbour AP 120b then instructs its identified EP to advertise at S102a and the second neighbour AP 120c instructs its identified EP to advertise at S102b. This advertising by the identified EPs can be carried out in accordance with any known technique, e.g. by each advertising EP sending a SMAP-D frame in the CC-EP.

In the examples given above, it was an AP 120 which initially determined that there was interference causing a problem in receiving communications in the upstream (uplink) direction (from the EPs to the APs). Hence, this sort of interference monitoring may be referred to as "upstream monitoring". Another type of interference monitoring may be referred to as "downstream monitoring", in which an EP is the device which initially determines that there is interference. The OWC network 100 may also perform downstream monitoring, as discussed below. It is an advantage of the present disclosure that upstream monitoring and downstream monitoring can be performed separately.

Figure 9:
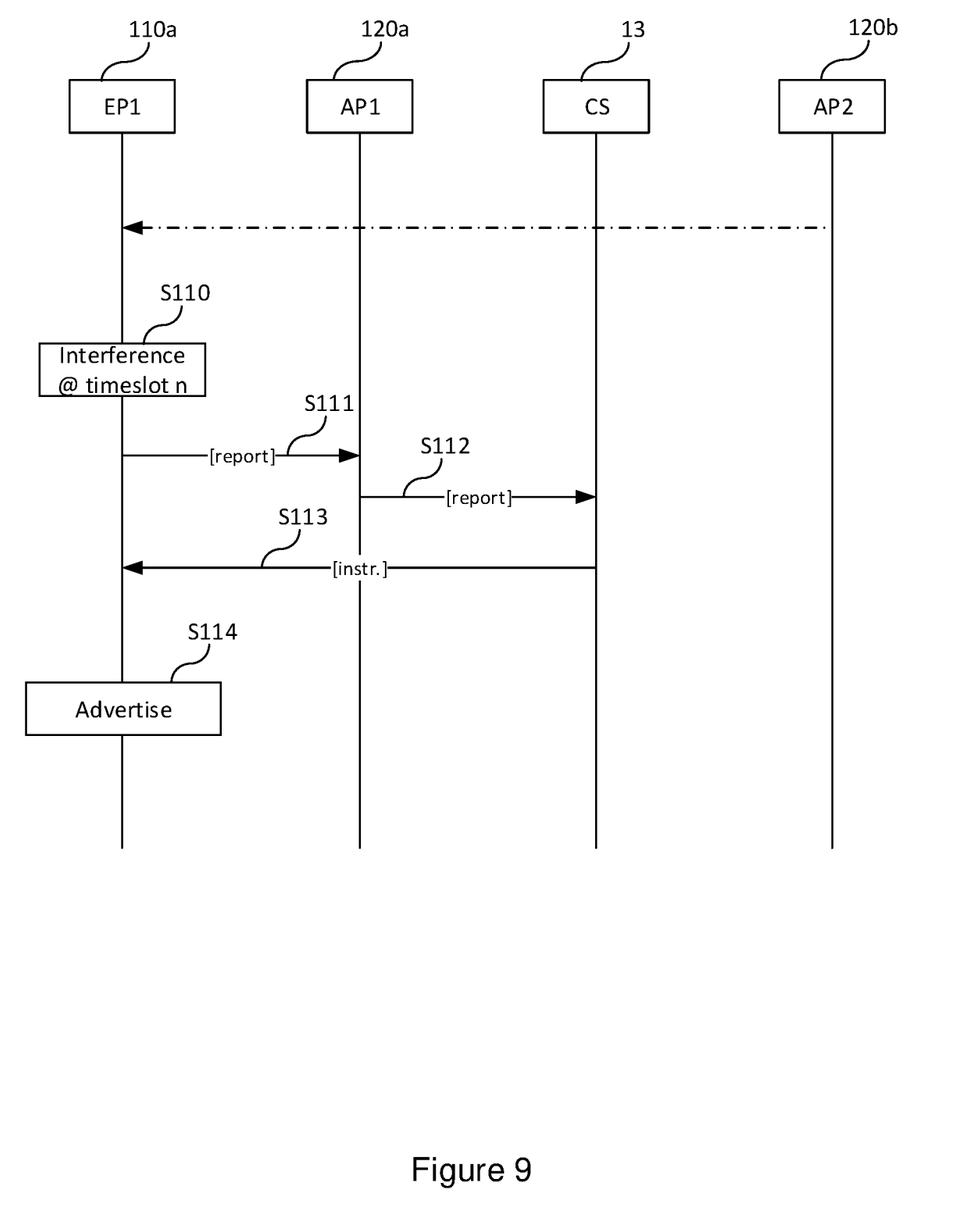
FIG. 9 shows schematically a second example method.

FIG. 9 shows schematically an additional method which may be performed by the OWC network 100. For the purposes of explanation, it is assumed that the OWC network 100 is arranged in a similar manner to that described above in relation to FIG. 7.

At S110, the local EP 110a detects an event indicative of interference. For example, the EP 110a may determine that it has not received, or not correctly received, data from the local AP 120a. In another example, the EP 110a may receive a signal from another AP (e.g. AP 210b) to which it is not registered (as indicated by a broken arrow in FIG. 9).

At S111, the local EP 110a sends a report to the local AP 120a indicating interference or possible interference.

At S112, the local AP 120a relays this report to the control system 13. As mentioned above, the control system 13 may be implemented locally at the local AP 120a (or in a distributed manner). Therefore, this relaying of the report may comprise the report being passed "internally" by the local AP 120a to the control system 13 (or part of the control system 13).

At S113, the control system 13 instructs the local EP 110a to advertise its presence.

At S114, the local EP 110a advertises its presence. Although the EP 110a may not currently interfere with any EP registered to the other AP, there is a high probability that it will at some point. Therefore, this has the advantage that the local EP 110a informs the other AP 120b of its presence. Appropriate interference mitigation steps may then be taken. Note that these mitigation steps may even be implemented before interference occurs.

In some examples, the control system 13 is configured to check whether the mitigation step(s) applied have actually reduced the amount of interference. This can be done for one or both upstream monitoring and downstream monitoring. For example, the control system 13 may determine that uplink interference for a timeslot used by a particular EP 110 persists despite the mitigation step(s). In such cases, the control system 13 may remove this timeslot from the allowed uplink timeslots for this EP 110. If the EP 110 reports a change of the current situation, e.g. the EP 110 detects a change of AP advertisements (which may be caused by a change of the EP position towards the APs), the control system 13 may determine to re-add the timeslot to the allowed timeslots for this EP 110.

Finally, there may be additional scheduling constraints as a result from the reporting. In these cases, the allowed timeslot(s) for a particular EP (the "allowed region" for that EP) may be reduced appropriately.

The term "controller" is used herein generally to describe various apparatus relating to, among other functions, the operation of one or more network devices or coordinators. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, compact disks, optical disks, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A control system for an optical wireless communications, OWC, network in which the OWC network comprises a plurality of access points for communicating with a plurality of endpoint devices via modulated light, the control system being configured to:
    in response to receiving a report indicating a timeslot during which a first one of said access points detected an event indicative of interference, transmit an indication of said timeslot to at least one other access point;
    wherein the indication causes said other access point to provide to the control system identifiers of the or each endpoint device that is registered with said other access point and was communicating with said other access point using said timeslot; and
    in response to receiving an identifier of a single endpoint device from said other access points, determine the single endpoint device identified by said identifier as a cause of the interference experienced at the first access point; and
    in response to receiving identifiers of plural endpoint devices from one or more of said other access points, cause said one or more other access points to instruct endpoint devices registered to said one or more other access points to advertise their presence.

2. The control system according to claim 1, wherein the control system is configured to transmit an indication of said timeslot to a closest one or more of the other access points to the first access point.

3. The control system according to claim 1, wherein the control system is configured to transmit an indication of said timeslot to at least one other access point physically located within a threshold distance of the first access point.

4. The control system according to claim 1, wherein the control system is configured to transmit an indication of said timeslot to at least one other access point having more than a threshold overlapping coverage with the first access point.

5. The control system according to claim 1, wherein the control system is configured to transmit an indication of said timeslot to all other access points in the same room of a building as the first access point.

6. The control system according to claim 1, wherein the control system is configured to transmit an indication of said timeslot to all other access points in the OWC network.

7. The control system according to claim 1, wherein the control system is configured to: in response to receiving a report from an endpoint device registered to one of the access points, indicating interference by at least one neighbour access point, cause the endpoint device to advertise its presence.

8. The control system according to claim 1, implemented at the first access point.

9. The control system according to claim 1, implemented in a distributed manner across a plurality of the access points.

10. A method performed by a control system of an optical wireless communications (OWC) network comprising a plurality of access points for communicating with a plurality of endpoint devices via modulated light, the method comprising:
    receiving a report indicating a timeslot during which a first access point detected an event indicative of interference;
    in response to receiving said report, transmitting an indication of said timeslot to at least one other access point;
    wherein the receipt of the indication of said timeslot causes said other access point to provide to the control system identifiers of the or each endpoint device that is registered with said other access point and was communicating with said other access point using said timeslot;
    in response to receiving an identifier of a single endpoint device from said other access point, determining the single neighbour endpoint device identified by said identifier as a cause of the interference experienced at the first access point; and
    in response to receiving identifiers of plural neighbour endpoint devices from one or more of said other access points, causing said one or more other access points to instruct endpoint devices registered to the one or more other access points to advertise their presence.

11. A method according to claim 10, comprising: in response to receiving a report from an endpoint device registered to one of the access points indicating interference by at least one neighbour access point, causing the endpoint device to advertise its presence.

12. An access point for an optical wireless communication (OWC) network for communicating with at least one endpoint device via modulated light, said access point being configured to:
    receive, from a control system according to claim 1, an indication of a timeslot during which another access point detected an event indicative of interference;
    wherein the access point is configured to:
        in response to receipt of said indication, determine an endpoint device that is registered to said access point and was communicating with said access point using said timeslot; and provide an identifier of said endpoint device to the control system.

13. A method performed by an access point of an optical wireless communication (OWC) network, the method comprising:
- receiving, from a control system, an indication of a timeslot during which another access point detected an event indicative of interference;
- wherein in response to receipt of the indication, determining an endpoint device that is registered to said access point and was communicating with the access point using said timeslot; and
- providing an identifier of said endpoint device to the control system.

14. An optical wireless communication (OWC) system comprising the control system of claim 1 and the plurality of access points.

* * * * *